United States Patent [19]

Seppanen et al.

[11] Patent Number: 4,505,259
[45] Date of Patent: Mar. 19, 1985

[54] HEAT REGULATION SYSTEM AND METHOD FOR BUILDING STRUCTURE

[75] Inventors: Olli Seppanen, Bellevue, Wash.; Antero Punttila, Kerava; Jukka Sulku, Helsinki, both of Finland

[73] Assignee: Ekono, Inc., Bellevue, Wash.

[21] Appl. No.: 293,137

[22] Filed: Aug. 17, 1981

[51] Int. Cl.³ .............................................. F24J 3/02
[52] U.S. Cl. .................................. 126/429; 126/430; 126/431; 126/422; 165/16
[58] Field of Search .............. 126/424, 429, 430, 431, 126/422, 417; 165/16, 18, 22, 34, 35, 40; 236/46 R

[56] References Cited

U.S. PATENT DOCUMENTS

| | | | |
|---|---|---|---|
| 2,559,871 | 7/1951 | Gay | 126/429 |
| 3,997,108 | 12/1976 | Mason | 126/422 |
| 4,051,999 | 10/1977 | Granger et al. | 126/429 |
| 4,151,954 | 5/1979 | Jacobs | 126/429 |
| 4,181,118 | 1/1980 | Mummert | 126/429 |
| 4,183,398 | 1/1980 | Ehrke | 126/429 |
| 4,301,787 | 11/1981 | Rice | 126/429 |
| 4,314,454 | 2/1982 | Kamejima et al. | 165/18 |

Primary Examiner—Samuel Scott
Assistant Examiner—Noah Kamen
Attorney, Agent, or Firm—Hughes, Barnard & Cassidy

[57] ABSTRACT

A building having window structures in exterior walls of the building. Each window structure has an exterior and an interior panel spaced from one another to define a plenum therebetween, with radiation absorbing blinds positioned in the plenum. The blinds absorb solar energy, and air from within the building is circulated through the plenum to absorb energy from the blinds. The heated air can be circulated through a heat exchange heat storage structure, and selectively discharged to the outside, circulated to another building portion, or recirculated into the same building portion. Control means are provided to combine outside air with the inside air being circulated to maintain proper temperature in the building within predetermined upper and lower temperature limits.

16 Claims, 9 Drawing Figures

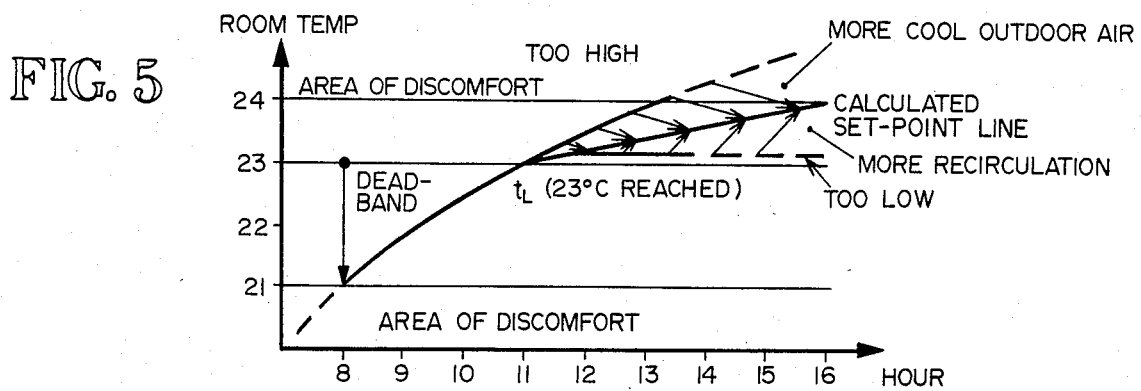
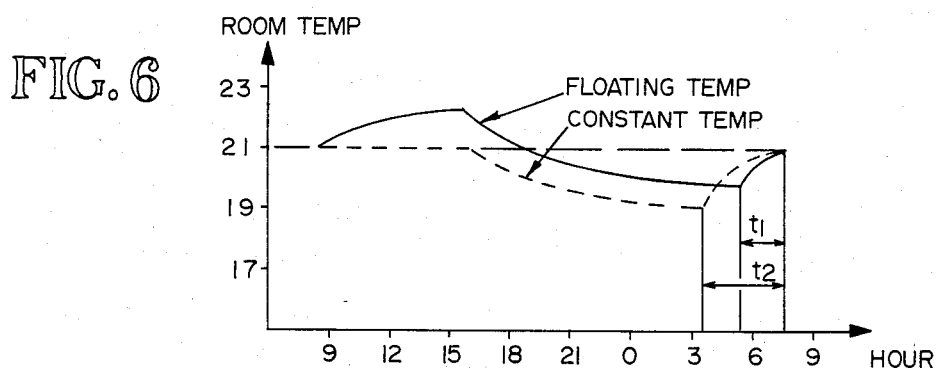
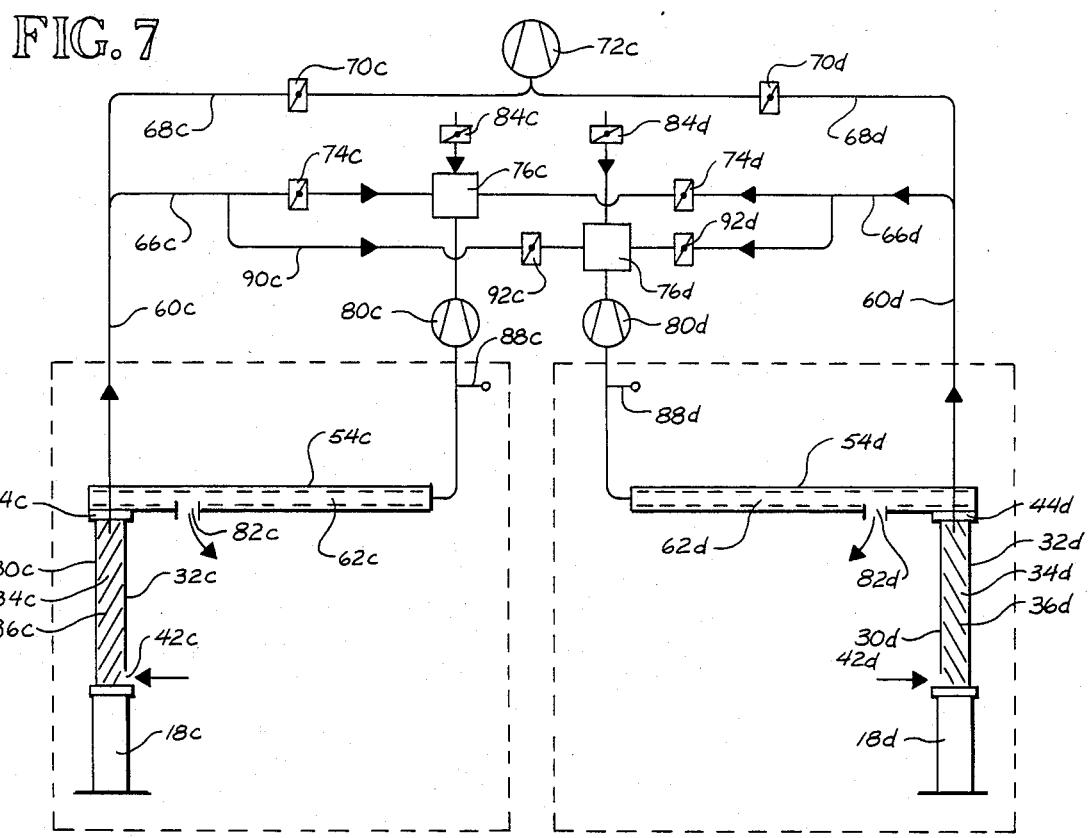

HEAT REGULATION SYSTEM AND METHOD FOR BUILDING STRUCTURE

BACKGROUND OF THE INVENTION

The present invention relates to a system and method for heating and/or cooling a building structure, for distribution and storage of heat within a building structure, and for economically controlling temperature within a building structure.

It has long been known that windows create particular problems not only in economically heating a building in winter and cooling in summner, but also in the control of the temperature in different parts of the building. One reason is that the windows generally have poorer insulating qualities in comparison with the walls of the building structure. In winter, not only does this give rise to excessive heat losses, but the formation of cold air adjacent the window causes unwanted drafts in a room.

In summer conditions, the problem is reversed. The sun's radiation penetrates the windows, and this makes it necessary to circulate air through the room or install mechanical cooling systems to avoid high room temperatures. In many cases the required cooling effect is so high that drafts from fast moving room air will result.

A number of years ago, the "extract-air window" system was developed to alleviate to a substantial extent these problems in that it can take care of a large proportion of the work normally done by customary heating and cooling systems. In this system, the window structure is formed as a pair of spaced panels, namely an exterior panel (usually a double window pane for better insulation) and an interior panel that is spaced from the exterior panel so as to provide a plenum between the two panels. Within the plenum is a set of blinds, which can be in the form of conventional Venetian blinds. At the lower part of the inner panel, there is a lower air intake opening so that room air (i.e. air from within the building) enters into this opening, passes upwardly through the plenum, and through an upper outlet opening to be recirculated in the building or discharged to outside atmosphere (or a combination of these).

There are a number of advantages to this arrangement. Let us take the example where the outside temperature is relatively cool, with the sun shining on one side of the building, while the other side of the building remains in the shade. Without the window arrangement described above, the radiation from the sun would normally pass through the window to heat the room on the sunny side of the building. If there are people in the room, artificial lighting, equipment that uses power, etc., yet more heat is generated. Thus, even though the outside temperature might be lower than the desired temperature inside the building, it still becomes necessary to cool the room having windows exposed to direct sunlight.

With the extract-air window system, much of the solar radiation is absorbed by the blinds within the plenum of the window structure. The air from the room is circulated upwardly through the plenum to absorb the heat from the blinds, and this air can be circulated to the opposite side of the building that is shaded from the direct solar radiation. The interior air at the shady side of the building (which would likely be somewhat cooler) can be recirculated back to the sunny portion of the building.

With regard to the extract-air window structure on the shady side of the building, this also has advantages. With circulation of the room air upwardly through the window structure plenum, this substantially eliminates the drafts that might otherwise occur if the temperature adjacent the window structure were permitted to drop too far below the temperature of the air in the remaining part of the room.

Also, during cold weather the extract-air window system can be used advantageously to store energy in the building structure itself in a manner to reduce heating costs. For example, during the daytime, room air can be circulated through the window structure that is exposed to the sun to extract heat from the blinds within the window structure. This heated air can then be circulated through a heat exchange structure that can be made as a hollow core slab that functions also as the floor and ceiling structure. Since the temperature in the plenum of the window structure can be reaised to as high as 20° to 80° F. above the interior room temperature, it becomes readily apparent that substantial heat transfer could take place between this air and the heat retaining structure. Then, in the nightime, air can be recirculated through the slab structure to extract heat therefrom and prevent the temperature in the building from dropping excessively. Then, in the morning, when it is desired to raise the building temperature to the desired level, less energy is required. Even though the blinds in the window provide a shield for the solar radiation, a substantial amount of the visible light is permitted to pass into the room.

The extract-air window system can be used advantageously to cool the building in the summer time. With regard to the window structure that is exposed to direct solar radiation, the room air can be circulated through the window structure to absorb heat and be discharged to the outside atmosphere so as to dissipate the effects of the solar radiation. Also, the hollow heat exchange slab structure can be used to absorb excessive heat in the building in the daytime. This is accomplished by first circulating cool nightime air through the circulation system to reduce the temperature of the heat exchange slab structure. Then, during the day, the room air is cooled by being circulated through the heat exchange slab structure.

The extract-air window system has been described in several publications, namely: a paper entitled "Extract-Air Window, a Key to Better Heat Economy in Buildings", presented at the Tenth World Energy Conference, Istanbul, Sept. 19 to 23, 1977; a paper entitled "Extract-Air Window as a Solar Collector and Hollow-core Concrete Slab as a Heat Utilizer", presented at the VVS 78 Conference, Stockholm Sweden, May 18, 1978; and a pamphlet entitled "The EKONO-HOUSE Energy Efficiency", published by Econo Consuoting Engineers, P.0. Box 27, 00131, Helsinki 13, Finland.

A search of U.S. patent literature disclosed a number of U.S. patents relating generally to heat exchange systems utilizing window structures and heat storage components in the building.

U.S. Pat. No. 3,050,443 shows a multi-paned window in which air is passed between the panes so that it can be heated by solar energy. Between the panes is placed either a heat-absorbing plate, or a venetian blind which absorbs or reflects the energy as needed.

U.S. Pat. No. 4,002,159 shows a venetian blind system that is placed in front of a window which creates a channel for air to be heated by solar energy.

U.S. Pat. No. 3,990,635 discloses a window with an air space. There is ducting above and below the window for passage of heated air.

U.S. Pat. No. 3,925,945 shows a window with air space that is used to heat air. There are vents so that the air can be passed into the room or to the outside as needed.

U.S. Pat. No. 3,012,294 relates to a window with a shutter which controls the amount of light that can pass. The shutter is made so that there is a good air seal.

U.S. Pat. No. 2,931,578 shows a device added to the window so that it can serve as an air heater.

U.S. Pat. No. 246,626 shows a window-like device added to the side of a building, vented into the room for heating it.

U.S. Pat. No. 4,147,300 relates to a system where air is heated in a hollow wall and passes through ducts to other parts of the building. The mass of the wall also serves as a heat storing means.

U.S. Pat. No. 4,069,973 discloses slabs that have ducts for heated or cooled air. This also acts as a heat storage means.

U.S. Pat. No. 4,069,971 discloses a system where air is ducted by passages within the wall which again stores heat.

In U.S. Pat. No. 4,006,856, there is a solar collector at the roof. The heated air is passed through the walls to storage mass under the floor.

In U.S. Pat. No. 2,877,990, there are ducts mounted in floor/ceiling slabs which carry air.

U.S. Pat. No. 2,559,869 discloses air passages in the walls. There is some solar collection such as through panel 19 on the roof.

In U.S. Pat. No. 1,065,762 there are hollow blocks used for air passages so as to ventilate the building, walls and basement.

Finally, U.S. Pat. No. 180,841 shows ventilating passages within the walls of a building.

SUMMARY OF THE INVENTION

The present invention is adapted to be used in a building structure having a first building portion that is exposed directly to solar energy and a second building portion shielded from direct solar energy. The system of the present invention is utilized to minimize energy losses in the building structure, and the system comprises a first window structure located at a first building portion so as to have direct exposure to solar energy.

The first window structure comprises an exterior panel positioned at an exterior surface of the building, and an interior panel spaced inwardly from the exterior panel to define a plenum between the exterior and interior panels. There is a solar energy absorbing means located in the plenum. The window structure has a first intake opening to permit air in the first building portion to flow into the plenum to be in heat exchange relationship with the heat absorbing means, and an outlet opening to permit the air to flow from the plenum.

In accordance with the first embodiment, there is a first heat exchange structure in the building adapted to receive air in heat exchange relationship and to discharge the air after heat exchange therewith. There is first valve means selectively operable to selectively distribute air from the first outlet opening of the window structure to pass through the first heat exchange structure or to bypass the first heat exchange structure.

There is first conduit means to receive air from the first valve means and to deliver the air to the second building portion. There is second conduit means to deliver air from the second building portion back to the first building portion. With this arrangement, solar energy is transferred to the air in the plenum and can then be selectively stored in the first heat exchange structure or transferred to the second building portion.

More particularly, the system comprises additional valve means selectively operable to direct air from the plenum through the first conduit to the second building portion, recirculate the air from the first plenum back to the first building portion, or discharge air from the first plenum to a location outside of the building. Also, there is valve means to selectively add to the inside air that is recirculated air from outside of the building structure.

In the building, there is a predetermined temperature range within which the system is to maintain temperature during a predetermined time period. (This predetermined time period would normally be the daytime working hours when the building is occupied.) This temperature range has a lower temperature limit and a higher temperature limit. Also, the building is characterized in that it would have a predetermined time/temperature curve along which indoor temperature rises from the lower to the higher limits during the predetermined time period.

The control means of the present invention comprises temperature sensing means to sense actual temperature in the building structure. The control means compares the actual temperature with the predicted temperature at any specific time to selectively operate the valve means to introduce cooler outside air into the building structure to lower the actual temperature toward the predicted temperature.

As a modification of the control system, there is an intermediate control temperature level, and the building temperature is permitted to change without the addition of outside air. However, when the control temperature level is reached, the control means then selectively adds outside air into the system to bring the temperature inside the building structure within the higher temperature limits during the predetermined time period.

In the preferred configuration, the intake opening for the window structure is at a lower location and the outlet opening is at an upper location. The heat exchange structure is positioned at a ceiling location in the building structure.

Also, in the preferred form of the present invention, there is a second window structure at the second building portion. The second window structure is similar to (or substantially identical to) the first window structure. Also, the second window structure has a valving system and a heat exchange structure similar to those related to the first window structure.

As a further modification of the present invention, the heat control system can be used in conjunction with structure where there is not the selective passage of air from the window structure or structures through the heat exchange structure. In such a design, the air circulated through the system from the window structure can be directed through a heat exchange structure immediately prior to directing the air into a room. As a further alternative, the control system of the present invention can be used in a system where the heat exchange structure is not present.

In the method of the present invention, air from the plenum can be selectively distributed through the heat exchange structure or made to bypass the heat exchange structure. This air can then selectively be directed to the second building portion, recirculated back to the first building portion, or discharged to outside atmosphere. Further, outside air can selectively be added to air within the building to maintain proper temperature.

In the method for controlling the temperature within the building, the temperature in the building is sensed and compared with the predicted temperature curve. Outside air is selectively added to bring the actual temperature in the building within the upper temperature limit within the predetermined time period.

Other features of the present invention will become apparent from the following detailed description.

BRIEF DESCRIPTION OF THE DRAWINGS

FIG. 5 is a graph similar to FIG. 4, illustrating the principles of the control method of the present invention;

FIG. 6 is a graph similar to those of FIGS. 4 and 5, illustrating the energy saving benefits achieved by the system of the present invention;

FIG. 7 is a second embodiment of the system of the present invention.

DESCRIPTION OF THE PREFERRED EMBODIMENT

Figure 1:
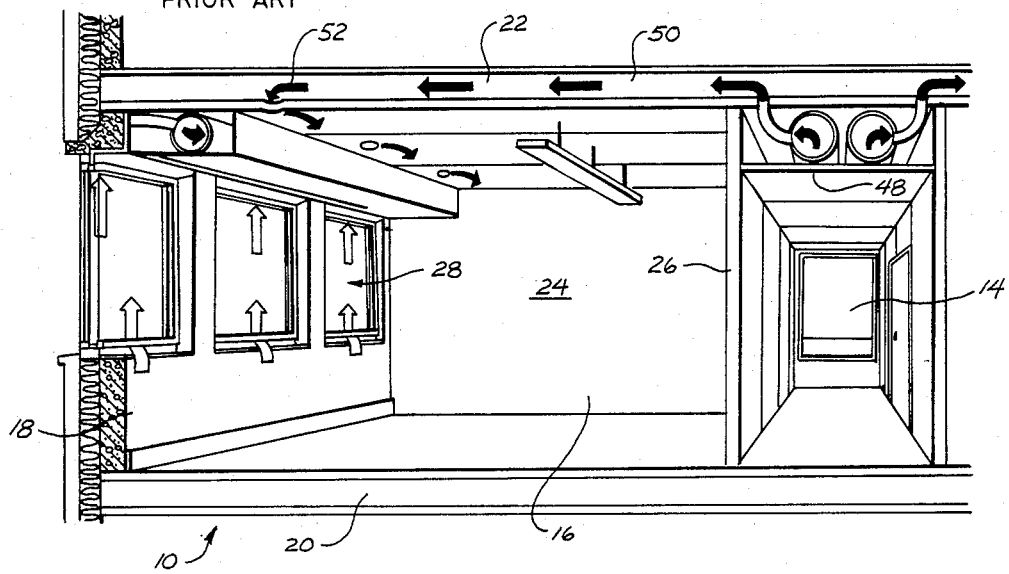
FIG. 1 is an isometric view showing a portion of a building incorporating the prior art extract-air window system.
Figure 2:
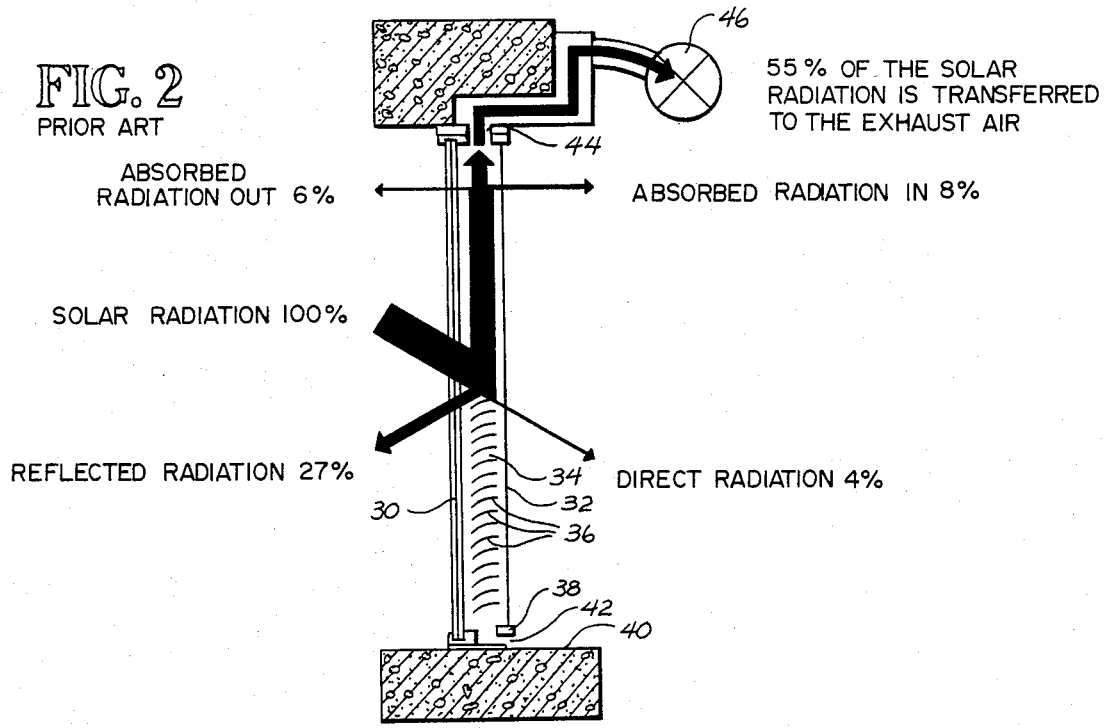
FIG. 2 is a sectional view taken through a vertical center line of the window structure of the prior art extract-air window system.

It is believed that a clear understanding of the present invention will be obtained by first describing the general characteristics of the prior art air extract window system, as illustrated in FIGS. 1 and 2. In FIG. 1, there is shown a portion of a building structure 10, which includes a hallway 14 and a room 16. There is an exterior wall 18, a floor 20, a ceiling 22, a room dividing wall 24, and interior walls 26 defining the hallway 14. It is to be understood, of course, that there are rooms 16 on both sides of the hallway, and that the building can be either a one story building or a multiple story building.

Mounted in the exterior wall 18 are several window structures 28 that are a key component of the extract-air window system. Again, it is to be understood that these window structures 28 are installed in at least the two opposite walls of the building, and quite possibly in all of the exterior walls of the building. As is illustrated more clearly in FIG. 2, the window structure comprises exterior and interior pane or panel members 30 and 32, respectively. In the particular configuration shown herein, each of the panels 30 and 32 have a generally planar rectangular configuration, and are positioned parallel and spaced moderately from one another to define therebetween a plenum 34. The exterior panel 30 is usually made as a double or multi-walled panel, with dead air or gas spaces between the walls for better insulating qualities. The interior panel 32 is commonly made as a single pane, but can be multi-panel. Both panels 30 and 32 are transparent and can typically be made of glass.

Positioned in the plenum 34 is a heat absorbing means which is desirably provided in the form of blinds 36, which are or may be similar in structure to Venetian blinds. Specifically, these blinds comprise elongate planar members extending horizontally across the width of the plenum 34. These blinds 36 can be tilted about their horizontal axes to substantially block solar radiation from outside the building or to permit a substantial portion of the solar radiation to pass through the blinds 36. The blinds 36 can also be vertically aligned.

In FIG. 2, the blinds 36 are shown tilted downwardly toward the outside so as to substantially block solar radiation. In the setting shown in FIG. 2, there is indicated in FIG. 2 percentage values showing a typical situation of how solar radiation is reflected and/or absorbed. In this particular example, of the 100% of solar radiation being directed at the window structure 28, twenty-seven percent is reflected away from the window and six percent is absorbed by the blinds 36 and then radiated outwardly. Eight percent of the radiation absorbed by the blinds 36 passes into the room 16, and another four percent passes into the room as direct radiation. The remaining 55% of the solar radiation is extracted from the blinds by air passing through the window structure, and this will be described immediately below.

The bottom edge 38 of the interior panel 32 is spaced upwardly from the bottom sill 40 to define with the sill 40 a lower air inlet 42 leading into the bottom portion of the plenum 34. At the upper end of the plenum 34, there is an air outlet 44 that leads to a conduit 46. Under circumstances where there is direct sunlight bearing against the blinds 36, these blinds 35 become heated to a temperature well above room temperature. This temperature can vary between 20° to 80° F. above inside temperature, depending upon the amount of radiation, the volume and rate of flow of air through the plenum 34, etc.

The heated air that passes from the window structure plenum 34 into the conduit 46 can be recirculated to other parts of the building that require additional heating or simply discharged to outside atmosphere if there is sufficient heat within the building 10.

With regard to the window structures 28 that are on the shady side of the building, there is a tendency for these window structures to become cooler than the adjacent wall structure because of the poorer insulating qualities of windows. (As indicated previously, when a window becomes cool, this can cause unwanted drafts of cold air in the room.) With the present window structure 28, air is drawn from the room upwardly through the plenum, and the air passes from the plenum 34 to be circulated through the system in the building. If the rooms on the sunny side of the building have excess heat, then the cooler air from the window structures 28 on the shady side of the building can simply be recirculated back to the rooms on the sunny side.

As shown in FIG. 1, the air from the window structures 28 can be recirculated through passageways 50 formed in the ceiling structure, and then into the room 16 through ceiling openings 52. Alternatively, these air return passages 52 can be provided in interior walls 26 or in the room dividing walls 24. The ceiling structure which forms the passageway 50 can be used to store excess heat developed in the day time and transmit this heat into the building air during night time to lessen the amount of temperature drop in the building air temperature in the night time, or even maintaining the temperature at a control level. Also, the hollow ceiling structure can be used for cooling in the day time. This is done by circulating cool air through the ceiling structure at night, and then circulating room air through the ceiling structure during the day time to dissipate heat from the room air into the ceiling structure.

It is to be understood that the structures and systems described above currently exist in the prior art. While the extract-air window system described above works very effectively as a heating and/or cooling system for a building, there are continuing efforts to make improvements in the system. The subject matter of the present invention described herein is a result of such continuing efforts, and this will be described below, with reference now being made to FIG. 3. Components of this first embodiment which are similar to corresponding components of the system described with reference to FIGS. 1 and 2 will be given the same numerical designations. For convenience of explanation, the components which are positioned on one side of the building structure will be identified with an "a" suffix, while those positioned on the opposite side of the house will have a "b" suffix added to the numerical designations.

Figure 3:
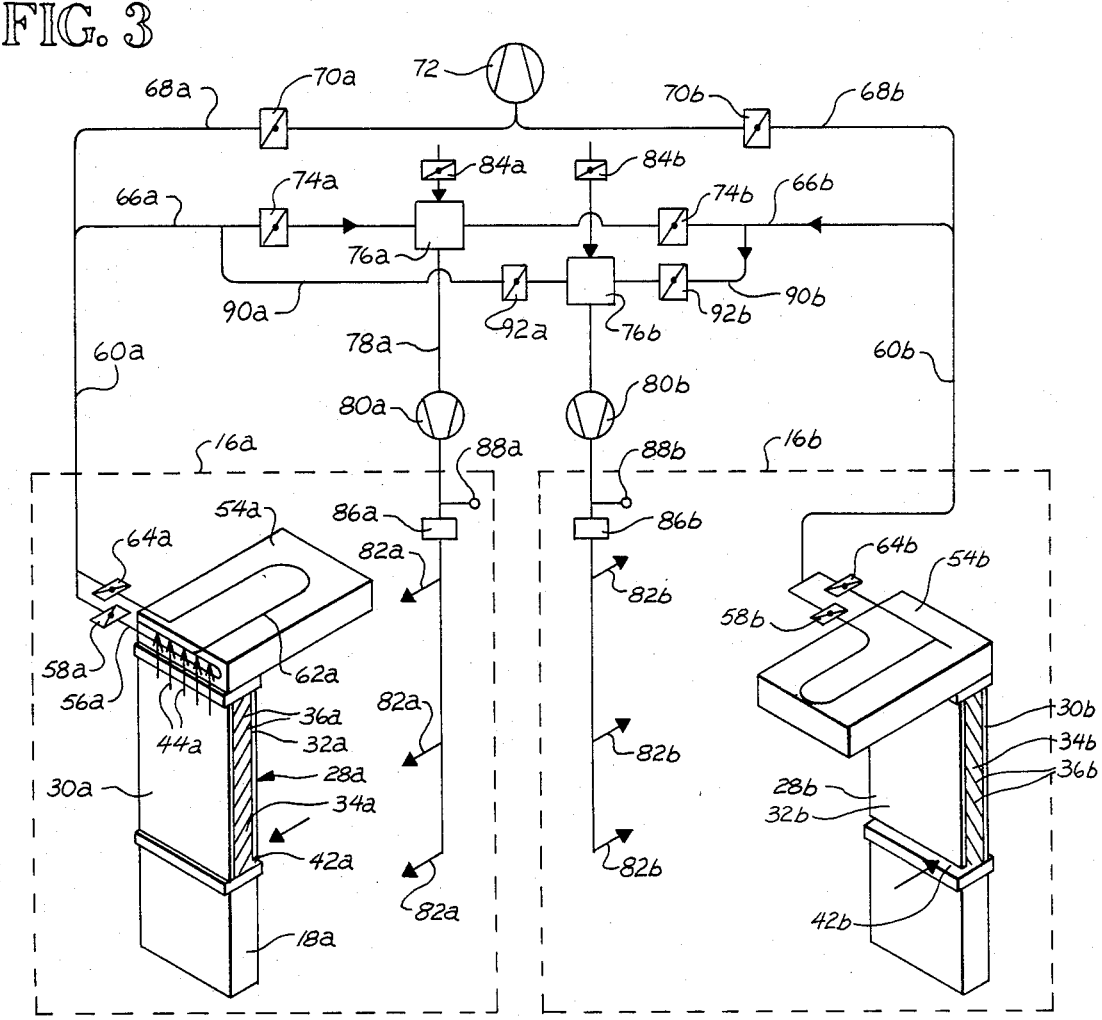
FIG. 3 is a semi-schematic drawing of one embodiment of the present invention incorporating the principles of the extract-air window system.

For ease of explanation, the system of FIG. 3 has been shown semi-schematically. On one side of the building, there is an exterior wall 18a, in which is mounted one of the window structures 28a that is typically used in the extract-air window system. Thus, the window 28a has an exterior panel 30a, an interior panel 32a, a plenum 34a, heat absorbing blinds 36a in the plenum 34a, a bottom air inlet 42a and an upper air outlet indicated by the arrows 44a. The room at which the window structure 28a is located is simply indicated schematically by the broken line 16a. It is to be understood that while only one window structure 28a is shown, there could be a plurality of such window structures 28a at the exterior wall of the room 16a. Also, there could be a plurality of the rooms 16a included within a single zone of the system. On the opposite side of the building, there is a room 16b having an extract-air window structure 28b similar or identical to the other window structure 28a. Since the components of the window 28b are substantially the same as those of the window structure 28a, these will not be described with reference to the window structure 28b, but the components will simply be given like numerical designations with the "b" suffix attached. Thus, there is the outside panel 30b, inside panel 32b, etc. Also the room 16b could be only one of several rooms included within a single zone of the system.

At the ceiling of the room 16a, there is a hollow core slab 54a which is used for heat storage purposes. Its capacity can be increased by inserting in the slab 54a eutectic salt capsules, and could be made in a variety of configurations. The exhaust passageway 44a connects through a lateral conduit 56a to a damper 58a that in turn leads to a conduit 60a. Also, the outlet 44a leads into one or a plurality of heat exchange passageways 62a formed in the slab 54a. It is to be understood that there are a plurality of these passageways 62a, but for ease of illustration only one is shown herein. These passageways 62a loop through the slab 54a and exit through a second damper 64a, which also leads into the conduit 60a. By closing the damper 58a and opening the damper 64a, the air exiting from the plenum 34a can be caused to circulate through the slab 54a. By reversing the position of the dampers (i.e. closing the damper 64a and opening the damper 58a) the air from the plenum 34a can be caused to bypass the slab 54a and pass directly into the conduit 60a. The opposite window structure 28b has similar components, and these are simply indicated by like numerical designations, with no description added.

The conduit 60a branches into two other conduits 66a and 68a. The conduit 68a connects to a damper 70a which in turn connects to an exhaust fan 72 that discharges air to the outside atmosphere. The conduit 66a leads to a damper 74a which in turn leads to a junction conduit 76a. The junction conduit 76a connects through a conduit 78a to a fan 80a that leads to return air openings 82a that direct air from the fan 80a back into the room 16a. Also leading into the junction conduit 76a is an outside air inlet vent 84a that can be opened to admit outside air into the junction conduit 76a, with this air flowing through the fan 80a and out the openings 82a into the room 16a.

Positioned between the fan 80a and the return air openings 82a is a heating and/or cooling device 86a. As a heat source this device 86a can simply be an electric heater or even a warm air duct to introduce warm air from a conventional furnace. Also, this device 86a could be provided in a manner to function as an air conditioner for summer time cooling.

Connected between the fan 80a and the return air openings 82a is a carbon dioxide sensor 88a. This sensor 88a is arranged so that if the air being recirculated back into the room 16a through the return air openings 82a is too rich in carbon dioxide, the outside air vent 84a is opened to permit fresh outside air to be circulated into the room 16a.

There is a bypass conduit 90a which connects to the line 66a upstream of the vent 74a. This bypass conduit 90a leads to a damper 92a that in turn leads to a junction conduit 76b. This junction conduit 76b corresponds to the conduit junction 76a and serves substantially the same function as the junction conduit 76a with respect to the components related to the room 16b and window structure 28b. All of the components described thus far with reference to FIG. 3 have corresponding components related to the room 16b and window structure 28b (with the exception of the exhaust fan 72 which is common to the components of both zones). Therefore, for ease of description, the components related to the room 16b and window structure 28b have simply been given like numerical designations with a "b" suffix to distinguish those components from the ones with the "a" suffix, and no additional description of those components will be given.

To describe generally the operation of the system shown in FIG. 3, let it first be assumed that it is the winter season, with the outside temperature averaging about 0° C. Let it be further assumed that the window structures 28a at the zone of the builing 16a are for a large part of the day exposed to direct sunlight, while the window structures 28b on the opposite side of the building are for the most part shielded from direct sunlight. Under these circumstances, the direct sunlight heats the blinds 36a generally to a temperature greater than the interior room temperature. If the heat generated by the sun against the blinds 36a is needed to heat the room 16a, the air heated in the plenum 34a can be recirculated directly and back into the room 16a by closing dampers 64a, 70a and 92a while opening dampers 58a and 74a. In this condition, the air will pass from the room 16a through the lower opening 42a into the window plenum 36a, thence through the conduit 66a back to the junction conduit 76a, to be drawn by the fan 80a and discharged through the return air openings 82a. When the recirculated air becomes stale, this will be sensed by the carbon dioxide detector 88a, and the controls of the system will be operated to open the damper 84a as needed to bring in the required amount of fresh air.

Let it now be assumed that the temperature in the room 16a is sufficiently high so that further heating of the room 16a is not required. This could occur where the room 16a is occupied by people, so that excess heat is generated in addition to the heat supplied by the building heating system. This excess heat can result from the heat of the bodies of the people in the room, from artificial lighting, from machines operating in the room, etc. It may be that the room 16b requires additional heat since it does not have the benefit of direct sunlight against the window structures 28b. In this case, air can be circulated from the room 16a to the room 16b by closing dampers 64a, 70a and 74a, while opening dampers 58a and 92a. Also, the dampers 64b, 70b and 92b are closed, with dampers 58b and 74b being opened. With this arrangement, the air from room 16a passes through the plenum 34a to be heated, then passes into the junction conduit 76b to be discharged into the room 16b through the return air openings 82b. The air in room 16b passes through the plenum 34b of the window structure 28b through the damper 74b to the junction conduit 76a to be discharged through the return air openings 82a.

Let us further examine the situation described immediately above, but make the added assumption that there is sufficient heat in the building so that the window structures 28a are actually receiving more solar heat than is necessary to maintain the temperature of the building at an adequate level. Under these circumstances, it would be desirable to store some of this solar heat to be used in the night time so as to reduce the temperature drop inside the building during the night hours. Under these circumstances, during the day time the damper 58a is closed and the damper 64a is opened so that air that is heated in the plenum 34a by direct sunlight is first circulated through the heat absorbing slab 54a before passing into the conduit 60a. Then, the air in conduit 60a can simply be recirculated back to the room 16a or over to the room 16b in the manner described above. In this manner, the day time heat is stored in the slab 54a and can be recovered at night simply by continuing the recirculation of the room air through the slab 54a.

The operations described immediately above are based on the assumption of winter time conditions where it is desirable to conserve heat in the building as much as possible. Let us now examine the situation of summertime conditions where it is desired to keep the interior of the building cool by dissipating heat to the outside atmosphere. Let us also make the same assumptions that the window structures 28a are for the most part exposed to day light solar energy, while the window structures 28b are for the most part shaded.

Under these conditions, during the day the air from the room 16a is circulated through the plenum 34a of the window structure 28a and discharged through the exhaust fan 72. The damper 58a would be open and the damper 64a closed so that the heat absorbing slab 54a is bypassed. The damper 70a is set so that the circulation through the window structure 28a is such that the temperature of the air leaving the plenum 34a is higher than the outside temperature. Thus, the replacement air which is taken in from the outside atmosphere through the damper 84a has less heat than the air being discharged to outside atmosphere so that there is a net outflow of heat from the building.

With regard to the window structures 28b on the shady side of the building structure, the air in room 16b would be circulated through the window structure 28b and discharged to the fan 72 only in circumstances where there is sufficient heat developed in the plenum 34b to raise the temperature therein above the temperature of the outside air.

Let it now be assumed that during the summer conditions the night time outside temperature drops below the inside temperature of the building. Under these circumstances, the dampers 84a and 84b are opened, and outside air is circulated into both of the rooms 16a and 16b. The air passes from the rooms upwardly through the window structures 28a and 28b and is then recirculated through the two slabs 54a and 54b to cool these slabs to a temperature close to the temperature of the outside air. After the air has passed through the two slabs 54a and 54b, this air, having been heated to some extent by heat being received from the slabs 54a and 54b, is discharged through the fan 72 to the outside atmosphere. During the following day, the slabs 54a and 54b, being at a lower temperature, will gradually absorb heat from the adjacent room.

With the arrangement described above with reference to FIG. 3, it becomes apparent that by selectively circulating the air through the slabs 54a and 54b, heating and/or cooling of the interior of the building can be achieved more effectively. Further, this can be achieved while maintaining a proper balance of temperature throughout the building.

Figure 4:
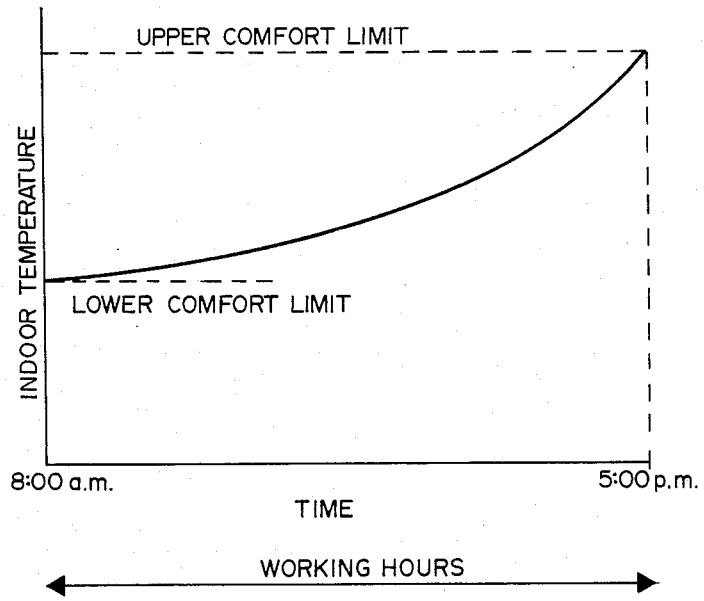
FIG. 4 is a graph showing a typical predicted temperature plotted against time.

To describe yet a further improvement in the present invention, reference is now made to the graphs shown in FIGS. 4, 5 and 6. There is a general range of a lower and an upper comfort limit for the indoor temperature within which the person can function without any serious discomfort. To control the system described in FIG. 3, the predicted room temperature is used in conjunction with the actual room temperature to maintain the indoor temperature within that comfort range during the normal working hours.

As indicated previously, when a room is occupied during the day time hours, the heat generated by the bodies of the people present, along with the heat generated by artificial heating, operation of machines, etc., can cause the room temperature to rise. If the temperature is to rise from the lower comfort limit to the upper comfort limit, it will generally follow a rather predictable curve, and a typical curve is shown in FIG. 4. Such a curve can generally be calculated during the design stage of the building.

To describe how predicted temperature is used in the present system, let it be assumed that the indoor temperature is measured at predetermined times during the day, and this is compared to the predicted temperature curve. If the actual temperature is below the predicted temperature for that particular time, the system is operated so that air continues to be recirculated through the building, without appreciable outside air being added. Outside air will be introduced only if the carbon dioxide content of the air becomes too high so that fresh air is required.

However, in the event that the predicted temperature is for any particular time below the room temperature, cooler outside air is introduced back into the system and warm inside air discharged to outside atmosphere so that by the end of the work day, the indoor temperature remains at or just below the upper comfort limit.

To describe how this can be done in actual practice, reference is now made to FIG. 5. First, an intermediate control temperature is selected at a level between the lower comfort limit and the upper comfort limit. In FIG. 5, this is shown as being selected at 23° C. Between the lower comfort limit (i.e. 21° C.) and the control level (i.e. 23° C.), the indoor temperature is permitted to float, and all of the air is recirculated back through the rooms, with outside air being added only to keep the air inside the building from becoming too stale. (As indicated previously, this is done in response to the carbon dioxide detectors 88a and 88b.) Thus the temperature is permitted to fluctuate freely in the dead band area which in this particular example is between 21° C. and 23° C. When the indoor temperature reaches the control level, this is compared to the predicted temperature curve. If the control level temperature is reached at a time earlier than it should be in comparison with the predicted curve, then outside air is added to the system, while inside air is discharged to the outside atmosphere.

The particular advantage of adding the outside air into the system before the upper comfort temperature limit is reached, is that it permits more efficient utilization of the outside air. For example, it sometimes happens that the temperature of the outside air is only moderately below the indoor temperature. It may be that even with mixing in very large amounts of outside air, it would not be possible to dissipate heat at a sufficient rate to maintain the indoor temperature below the upper comfort limit before the end of the normal work day. Also, by permitting the temperature to float for a period of time, with no outside air added, it is possible to calculate more precisely the amount of outside air needed to obtain the desired end temperature.

To illustrate the benefits obtained by the floating control system of the present invention, reference is now made to FIG. 6. Let it be assumed that the indoor temperature is controlled in accordance with the common prior art method of maintaining the inside temperature at a constant level, which in FIG. 6 is shown at 21° C. Let it further be assumed that the outside temperature is somewhat below the inside temperature so that the indoor temperature in the evening can be expected to drop when the thermostat in the inside of the building is turned down. A typical decline in temperature from 21° C. level is shown in broken lines, and it can be seen that in order to bring the inside temperature back up to a sufficient level, the heating must begin at an earlier time, this heating period being indicated in FIG. 6 at $t_2$. On the other hand, let it be assumed that the indoor temperature is permitted to float within the confines of the lower comfort and upper comfort limit. This curve is illustrated in the full line curve of FIG. 6. After a moderate temperature rise during the day, the indoor temperature also falls below the lower comfort limit. However, since the lowest temperature reached is still not especially low, there is a shorter period of time required in the early morning hours to bring the indoor temperature back up to the lower comfort level. This shorter period of time is indicated at $t_1$ in FIG. 6.

FIG. 7 shows a further embodiment of the present invention. The components of the embodiment of FIG. 7 which correspond to components of the embodiment of FIG. 3 will be given like numerical designations, with a "c" suffix distinguishing those on one side of the structure, and a "d" suffix distinguishing those on the opposite side of the structure.

The main differences in the systems shown in FIG. 3 and FIG. 7 relate to the manner in which the air is passed through the heat exchange slabs 54c and 54d. In the system of FIG. 7, the air passing upwardly through the window structures 28c and 28d at all times passes directly to the conduits 60c and 60d, respectively. The air returning from the fans 80c and 80d is directed through the heat exchange slabs 54c and 54d to be exhausted into the rooms 16c and 16d through return air openings 82c and 82d, respectively.

With the arrangement of FIG. 7, air can be circulated through the slab 54c without having been immediately passed through the window structure 28c, and likewise air can be passed through the slab 54d without having been passed through the window structure 28d immediately before. In other respects, the system shown in FIG. 7 is substantially similar to the system shown in FIG. 3. Accordingly, a further detailed description of the system shown in FIG. 7 will not be given herein. Rather, the numerical designations in the drawing of FIG. 7 will suffice to identify the nature of the components of the system of FIG. 7.

Figure 8:
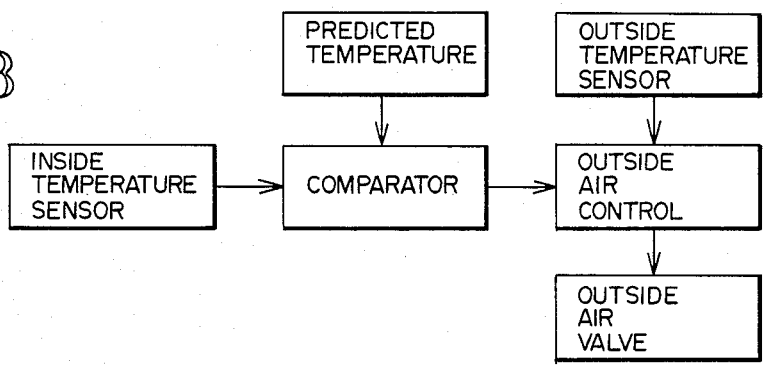
FIGS. 8 and 9 are schematic drawings of the control system of the present invention.

To illustrate the control mechanism of the present invention, reference is first made to FIG. 8. There is an inside temperature sensor (i.e. a thermometer) to sense temperature in an inside building location, and the output of this sensor is directed to a comparator. The predicted temperature (such as that shown in FIG. 4) is also directed to the comparator. If the inside temperature at a particular time is lower than the projected temperature for that same time, the comparator transmits a signal that no additional outside air is needed in the system. However, if the inside temperature is greater than the predicted temperature, the comparator transmits a signal having a value related to the amount of the difference. This signal is transmitted to the outside air control. This can be repeated as is necessary to correct for the proper inflow of outside air.

There is an outside temperature sensor which determines the temperature of the outside air, and this is also transmitted to an outside air control along with the output from the comparator. From the signal from the comparator and the temperature value of the outside air, the outside air control device sets the outside air intake valve to bring in the proper amount of outside air to bring the time temperature curve within proper limits so that the upper temperature comfort limit is not exceeded at the end of the predetermined temperature control period. (Presumably this period would be for the normal working day).

Figure 9:
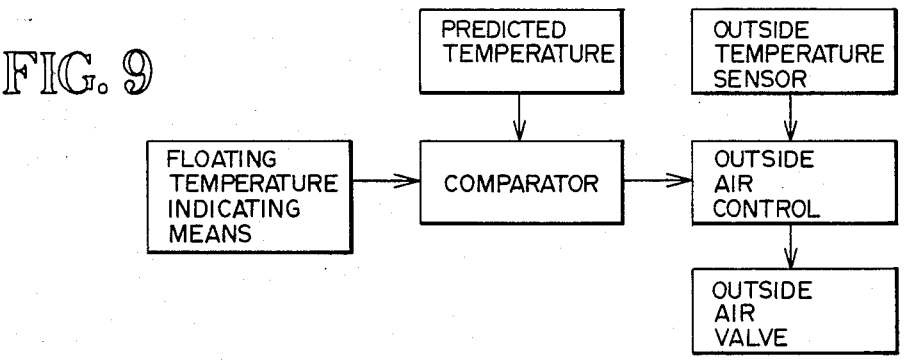

A modification of the control system of FIG. 8 is illustrated in FIG. 9. In FIG. 9, there is a floating temperature indicating means which tracks the temperature between the lower temperature comfort limit and the intermediate control level, so as to in effect provide a time/temperature curve such as that shown in FIG. 5 in the "dead-band region". Then this information is directed to the comparator. Also the predicted temperature is directed to the comparator, and the curve of the floating temperature indicating means is compared with that provided by the predicted temperature input. If the slope of the curve indicated by the floating temperature indicating means is less than that of the predicted temperature, then the comparator provides an output indicating that no outside air is needed. On the other hand, if the time/temperature curve of the floating temperature indicating means has a slope greater than that of the predicted temperature, then the comparator provides a value related to the difference of the slope of the curves and transmits this to the outside air control device. The outside air control device also is responsive to the outside temperature sensor so that it can provide a signal to the outside air valve to bring in the outside air at an appropriate rate so that at the end of the predetermined time period the upper temperature comfort limit will not be exceeded.

We claim:

1. In a building structure a system for minimizing energy losses in the building structure, wherein there is a predetermined temperature range within which said system is to maintain the temperature in the building structure during a predetermined time period, said temperature range having a lower temperature limit, said building structure being characterized in that it has a predicted time/temperature curve along which indoor temperature rises from said lower to said higher limits during the predetermined time period, said system further comprising:
   (a) a window structure comprising:
      (i) an exterior panel positioned at an exterior surface of the building,
      (ii) an interior panel spaced inwardly from said exterior panel to define a plenum between the exterior and interior panels,
      (iii) solar energy absorbing means located in said plenum,
      (iv) said window structure having first intake opening means to permit air in said building structure to flow into said plenum to be in heat exchange relationship with the heat absorbing means, and first outlet opening means to permit said air to flow from said plenum,
   (b) temperature sensing means to sense actual temperature in the building structure,
   (c) first valve means selectively operable to recirculate air from said plenum in said building structure and to selectively add air from outside the building structure to the recirculated air,
   (d) control means to compare the actual temperature with predicted temperature at any specific time and to selectively operate the first valve means to introduce cooler outside air into the building structure to lower the actual temperature toward the predicted temperature.

2. The system as recited in claim 1, wherein there is a predetermined control temperature level between the lower temperature limit and the higher temperature limit, said control means being further characterized in that for temperatures in the building structure between the lower temperature limit and the control temperature level, building temperature is permitted to change without said control means adding outside air for temperature adjustment, but for temperatures inside the building structure between said control temperature level and said high temperature limit, said first valve means is selectively operated to introduce air from outside the building structure to bring the temperature inside the building structure within the higher temperature limit during the predetermined time period.

3. The system as recited in claim 1, wherein there is second valve means selectively operable to direct air from said first plenum selectively through a first conduit means to a first building portion spaced from said window structure, or to recirculate the air from the plenum back to a second building portion adjacent to said window structure.

4. The system as recited in claim 1, wherein there is second valve means selectively operable to deliver air from said plenum selectively through a conduit means to a first building portion or to discharge the air from the plenum to a location outside of the building.

5. The system as recited in claim 1, further comprising sensing means responsive to quality of air being recirculated through said system, said sensing means being operatively connected to said control means to selectively operate the second valve means to introduce outside air into the building structure to replace air presently in the building structure.

6. In a building structure, a method for minimizing energy losses in the building structure, wherein there is a predetermined temperature range within which said system is to maintain the temperature in the building structure during a predetermined time period, said temperature range having a lower temperature limit, said building structure being characterized in that it has a predicted time/temperature curve along which indoor temperature rises from said lower limit to a higher limit during the predetermined time period, said building structure further having a window structure comprising:
   (a) an exterior panel positioned at an exterior surface of the building,
   (b) an interior panel spaced inwardly from said exterior panel to define a plenum between the exterior and interior panels,
   (c) solar energy absorbing means located in said plenum,
   (d) said window structure having first intake opening means to permit air in said first building portion to flow into said plenum to be in heat exchange relationship with the heat absorbing means, and first outlet opening means to permit said air to flow from said plenum,
a method to control temperature in said building, said method comprising:
   (a) sensing actual temperature in the building structure,
   (b) selectively recirculating air from said plenum in said building structure and selectively adding air from outside the building structure to the recirculated air,
   (c) comparing the actual temperature with predicted temperature at any specific time and selectively introducing cooler outside air into the building structure to lower the actual temperature toward the predicted temperature.

7. The method as recited in claim 6, wherein there is a predetermined control temperature level between the lower temperature limit and the higher temperature limit, said method being further characterized in that for temperatures in the building structure between the lower temperature limit and the control temperature level, building temperature is permitted to change without said control means adding outside air for temperature adjustment, but for temperatures inside the building structure between said control temperature level and said high temperature limit, selectively introducing air from outside the building structure to bring the temperature inside the building structure within the higher temperature limit during the predetermined time period.

8. In a building structure having a first building portion that is exposed directly to solar energy and a second building portion shielded from direct solar energy, a system for minimizing energy losses in the building structure, said system comprising:
   (a) a window structure located at said first building portion and having direct exposure to solar energy, said window structure comprising:
      (i) an exterior panel positioned at an exterior surface of the building structure,
      (ii) an interior panel spaced inwardly from said exterior panel to define a plenum between the exterior and interior panels,
      (iii) solar energy absorbing means located in said plenum,
      (iv) said window structure having intake opening means to permit air in said first building portion to flow into said plenum to be in heat exchange relationship with the heat absorbing means, and outlet opening means to permit said air to flow from said plenum,
   (b) a heat exchange structure in the building adapted to receive air in heat exchange relationship and to discharge said air after heat exchange therewith,
   (c) first valve means selectively operable to selectively distribute air from the outlet opening means to pass through the heat exchange structure or to bypass said heat exchange structure,
   (d) first conduit means to receive air from said first valve means and to deliver said air to said second building portion,
   (e) second conduit means to deliver air from said second building portion back to said first building portion,
whereby solar energy is transferred to the air in the plenum and can then be selectively stored in the heat exchange structure or transferred to said second building portion, said system being characterized in that there is a predetermined temperature range within which said system is to maintain the temperature in the building structure during a predetermined time period, said temeperature range having a lower temperature limit and a higher temperature limit, said building structure being characterized in that it has a predicted time/temperature curve along which indoor temperature rises from said lower to said higher limits during the predetermined time period, said system further comprising:
   (a) temperature sensing means to sense actual temperature in the building structure,
   (b) second valve means selectively operable to recirculate air from said plenum in said building structure and to selectively add air from outside the building structure to the recirculated air,
   (c) control means to compare the actual temperature with predicted temperature at any specific time and to selectively operate the second valve means to introduce cooler outside air into the building structure to lower the actual temperature toward the predicted temperature.

9. The system as recited in claim 8, wherein there is a predetermined control temperature level between the lower temperature limit and the higher temperature limit, said control means being further characterized in that for temperatures in the building structure between the lower temperature limit and the control temperature level, building temperature is permitted to change without said control means adding outside air for temperature adjustment, but for temperatures inside the building structure between said control temperature level and said higher temperature limit, said second valve means is selectively operated to introduce air from outside the building structure to bring the temperature inside the building structure within the higher temperature limit during the predetermined time period.

10. A system for minimizing energy losses in a building structure, said system comprising:
   (a) a window structure having direct exposure to solar energy, said window structure comprising:
      (i) an interior panel positioned at an exterior surface of the building structure,
      (ii) an interior panel spaced inwardly from said exterior panel to define a plenum between the exterior and interior panels,
      (iii) solar energy absorbing means located in said plenum,
      (iv) said window structure having intake opening means to permit air in said building structure to flow into said plenum to be in heat exchange relationship with the solar energy absorbing means, and outlet opening means to permit said air to flow from said plenum,
   (b) a heat exchange structure in the building structure adapted to receive air in heat exchange relationship and to discharge said air after heat exchange therewith,
   (c) first valve means selectively operable to selectively distribute air from the outlet opening means to pass through the heat exchange structure or to bypass said heat exchange structure,
   (d) conduit means to deliver air from said first valve means to said building structure,
whereby solar energy is transferred to the air in the plenum and can then be selectively stored in the heat exchange structure or transferred into said building structure, said system being characteried in that there is a predetermined temperature range within which said system is to maintain the temperature in the building structure during a predetermined time period, said temperature range having a lower temperature limit and a higher temperature limit, said building structure being characterized in that it has a predicted time/temperature curve along which indoor temperature rises from said lower to said higher limit during the predetermined time period, said system further comprising:
   (a) temperature sensing means to sense actual temperature in the building structure,
   (b) second valve means selectively operable to recirculate air from said plenum in said building structure and to selectively add air from outside the building structure to the recirculated air,
   (c) control means to compare the actual temperature with predicted temperature at any specific time and to selectively operate the second valve means to introduce cooler outside air into the building structure to lower the actual temperature toward the predicted temperature.

11. In a building structure having a first building portion that is exposed directly to solar energy and a second building portion shielded from direct solar energy, a system for minimizing energy losses in the building structure, said system comprising:

(a) a first window structure located at said first building portion and having direct exposure to solar energy, and a second window structure located at said second building portion so as to be shielded from direct solar radiation, said first and second window structures each comprising:
  (i) an exterior panel positioned at an exterior surface of the building,
  (ii) an interior panel spaced inwardly from said exterior panel to define a plenum between the exterior and interior panels,
  (iii) solar energy absorbing means located in said plenum,
  (iv) each of said window structures having intake opening means to permit air in its related building portion to flow into said plenum to be in heat exchange relationship with the solar energy absorbing means, and outlet opening means to permit said air to flow from said plenum,
(b) first and second heat exchange structures in the building adapted to receive air in heat exchange relationship and to discharge said air after heat exchange therewith,
(c) first and second valve means selectively operable to selectively distribute air from the outlet opening means of the first and second window structures to pass through the first and second heat exchange structures or to bypass said first and second heat exchange structures,
(d) first and second conduit means to receive air from said first and second valve means, respectively, and to deliver said air to said second and first building portions, respectively,
whereby solar energy is transferred to the air in the plenums and can then be selectively stored in the first and second heat exchange structures or transferred between said building portions, said system being characterized in that there is a predetermined temperature range within which said system is to maintain the temperature in the building structure during a predetermined time period, said temperature range having a lower temperature limit and a higher temperature limit, said building structure being characterized in that it has a predicted time/temperature curve along which indoor temperature rises from said lower to said higher limits during the predetermined time period, said system further comprising:
  (a) temperature sensing means to sense actual temperature in the building structure,
  (b) third and fourth valve means selectively operable to recirculate air from said first and second window structures in said building structure and to selectively add air from outside the building structure to the recirculated air,
  (c) control means to compare the actual temperature with predicted temperature at any specific time and to selectively operate the third and fourth valve means to introduce cooler outside air into the building structure to lower the actual temperature toward the predicted temperature, 12. The system as recited in claim 11, wherein there is a predetermined control temperature level between the lower temperature limit and the higher temperature limit, said control means being further characterized in that for temperatures in the building structure between the lower temperature limit and the control temperature level, building temperature is permitted to change without said control means adding outside air for temperature adjustment, but for temperatures inside the building structure between said control temperature level and said higher temperature limit, said third and fourth valve means are selectively operated to introduce air from outside the building structure to bring the temperature inside the building structure within the higher temperature limit during the predetermined time period.

13. In a building structure having a first building portion that is exposed directly to solar energy and a second building portion shielded from direct solar energy, where there is:
  (a) a window structure located at said first building portion and having direct exposure to solar energy, said window structure comprising:
    (i) an exterior panel positioned at an exterior surface of the building,
    (ii) an interior panel spaced inwardly from said exterior panel to define a plenum between the exterior and interior panels,
    (iii) solar energy absorbing means located in said plenum,
    (iv) said window structure having intake opening means to permit air in said first building portion to flow into said plenum to be in heat exchange relationship with the solar energy absorbing means, and outlet opening means to permit said air to flow from said plenum,
  (b) a heat exchange structure in the building adapted to receive air in heat exchange relationship and to discharge said air after heat exchange therewith,
a method for receiving and distributing energy in said structure said method comprising:
  (a) selectively distributing air from the outlet opening means through valve means to pass through the heat exchange structure or to bypass said heat exchange structure,
  (b) receiving air from said valve means and delivering said air to said second building portion,
  (c) delivering air from aid second building portion back to said first building portion,
whereby solar energy is transferred to the air in the plenum and can then be selectively stored in the heat exchange structure or transferred to said second building portion, said method being further characterized in that there is a predetermined temperature range within which temperature in the building structure is to maintained during a predetermined time period, said temperature range having a lower temperature limit and a higher temperature limit, said building structure being characterized in that it has a predicted time/temperature curve along which indoor temperature rises from said lower to said higher limits during the predetermined time period, said method further comprising:
  (a) sensing actual temperature in the building structure,
  (b) selectively recirculating air from said plenum in said building structure and selectively adding air from outside the building structure to the recirculated air,
  (c) comparing the actual temperature with predicted temperature at any specific time and selectively introducing cooler outside air into the building structure to lower the actual temperature toward the predicted temperature.

14. The method as recited in claim 13, wherein there is a predetermined control temperature level between the lower temperature limit and the higher temperature limit, said method being further characterized in that for temperatures in the building structure between the lower temperature limit and the control temperature level, building temperature is permitted to change without said control means adding outside air for temperature adjustment, but for temperatures inside the building structure between said control temperature level and said higher temperature limit, selectively introducing air from outside the building structure to bring the temperature inside the building structure within the higher temperature limit during the predetermined time period.

15. A method for minimizing energy losses in a building structure, where said structure comprises:
  (a) a window structure having direct exposure to solar energy, said window structure comprising:
    (i) an exterior panel positioned at an exterior surface of the building,
    (ii) an interior panel spaced inwardly from said exterior panel to define a plenum between the exterior and interior panels,
    (iii) solar energy absorbing means located in said plenum,
    (iv) said window structure having intake opening means to permit air in said building structure to flow into said plenum to be in heat exchange relationship with the solar energy absorbing means, and outlet opening means to permit said air to flow from said plenum,
  (b) a heat exchange structure in the building structure adapted to receive air in heat exchange relationship and to discharge said air after heat exchange therewith,
said method comprising:
  (a) selectively distributing through valve means air from the outlet opening means to pass through the heat exchange structure or to bypass said heat exchange structure,
  (b) delivering air from said valve means to said building structure,
whereby solar energy is transferred to the air in the plenum and can then be selectively stored in the heat exchange structure or transferred into said building structure, said method further comprising selectively recirculating air from said plenum into the building structure and selectively adding to the recirculated air additional air from outside of the building structure.

16. A method of minimizing energy losses in a building structure, where said structure comprises:
  (a) a window structure having direct exposure to solar energy, said window structure comprising:
    (i) an exterior panel positioned at an exterior surface of the building,
    (ii) an interior panel spaced inwardly from said exterior panel to define a plenum between the exterior and interior panels,
    (iii) solar energy absorbing means located in said plenum,
    (iv) said window structure having intake opening means to permit air in said first building portion to flow into said plenum to be in heat exchange relationship with the solar energy absorbing means, and outlet opening means to permit said air to flow from said plenum,
  (b) a heat exchange structure in the building structure adapted to receive air in heat exchange relationship and to discharge said air after heat exchange therewith,
said method comprising:
  (a) selectively distributing through valve means air from the first outlet opening means to pass through the heat exchange structure or to bypass said first heat exchange structure,
  (b) delivering air from said valve means to said building structure,
whereby solar energy is transferred to the air in the plenum and can then be selectively stored in the heat exchange structure or transferred into said building structure, said method being further characterized in that their is a predetermined temperature range within which the temperature in the building structure is maintained during a predetermined time period, said temperature range having a lower temperature limit and a higher temperature limit, said building structure being characterized in that it has a predicted time/temperature curve along which indoor temperature rises from said lower to said higher limits during the predetermined time period, said method further comprising:
  (a) sensing actual temperature in the building structure,
  (b) selectively recirculating air from said plenum in said building structure and selectively adding air from outside the building structure to the recirculated air,
  (c) comparing the actual temperature with predicted temperature at any specific time and selectvely introducing cooler outside air into the building structure to lower the actual temperature toward the predicted temperature.

* * * * *